June 11, 1963  A. S. CORNFORD  3,093,426
TRUNNION BEARING

Filed Dec. 16, 1959  4 Sheets-Sheet 1

INVENTOR
ARTHUR S. CORNFORD
BY *Fetherstonhaugh & Co*
ATTORNEYS.

June 11, 1963 — A. S. CORNFORD — 3,093,426
TRUNNION BEARING

Filed Dec. 16, 1959 — 4 Sheets-Sheet 2

INVENTOR
ARTHUR S. CORNFORD
BY Featherstonhaugh & Co.
ATTORNEYS.

INVENTOR
ARTHUR S. CORNFORD
BY Fetherstonhaugh & Co
ATTORNEYS.

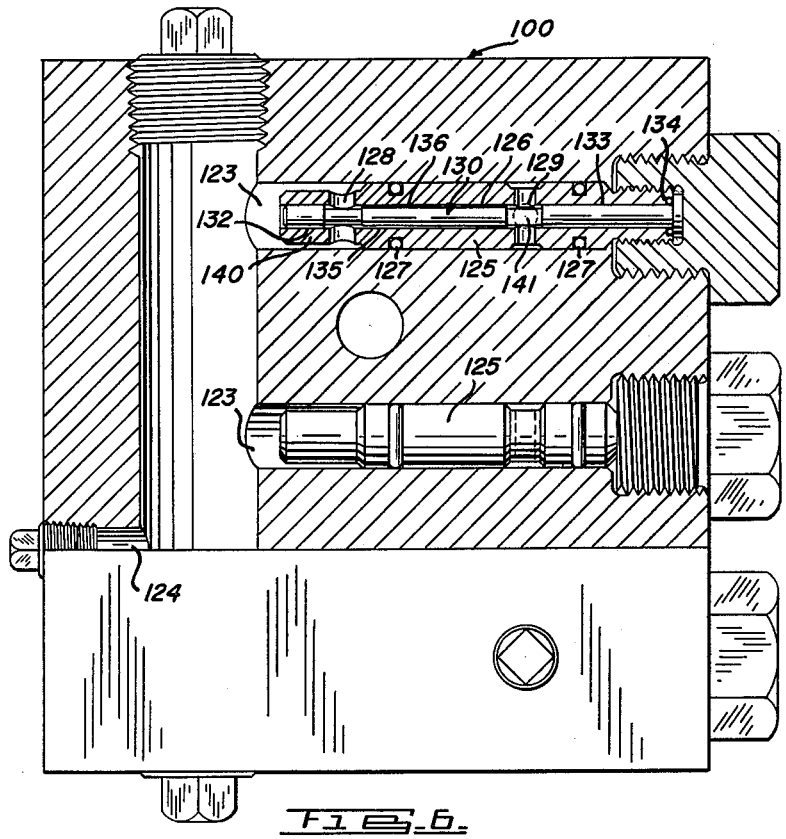
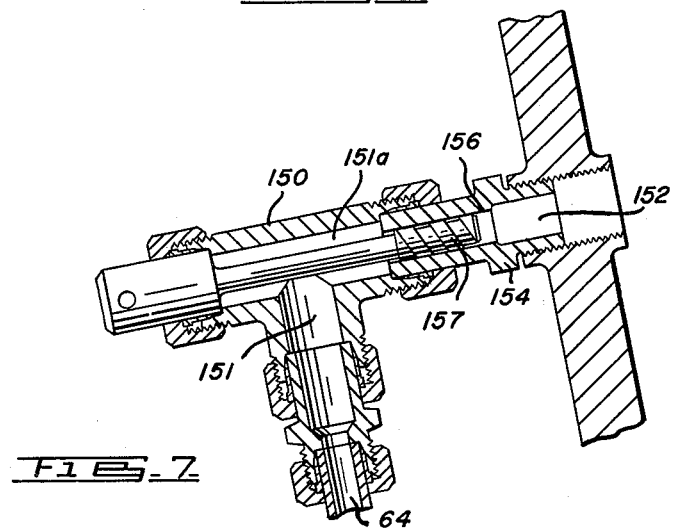

United States Patent Office 3,093,426
Patented June 11, 1963

3,093,426
TRUNNION BEARING
Arthur S. Cornford, Toronto, Ontario, Canada, assignor to Aerofall Mills Inc., Columbus, Ohio
Filed Dec. 16, 1959, Ser. No. 859,926
Claims priority, application Canada Apr. 28, 1959
13 Claims. (Cl. 308—73)

This invention relates to trunnion bearings for use with journals particularly very large diameter journals such as those provided on large diameter grinding mills or the like.

In particular this invention relates to trunnion bearings in which the bearing load is distributed over a plurality of bearing shoes, which shoes are provided with means for introducing oil under pressure on to the bearing surfaces of the shoes whereby to form an oil film between the bearing surface and the journal which effectively separates the surfaces of the journal and the shoes.

In the servicing of known trunnion bearings it has been necessary to jack-up the journal in order to gain access to the bearing shoes. Thus the resurfacing of shoes in known devices is a complex and costly operation.

It is an object of the present invention to provide a trunnion bearing in which individual bearing shoes may be readily serviced without the necessity of applying jacks to raise the journal off the bearing shoes.

Trunnion bearings of the type referred to above are also subject to sealing difficulties between journal and trunnion housing. It is an object of the present invention to provide sealing means in which the escape of oil from the bearing shoes to the outside of the trunnion and the ingress of foreign matter to the bearing surfaces, is prohibited.

It is well known that with non-rolling bearings there is a considerable increase in the coefficient of friction when the journal is at rest. This results in the requirement for a very high torque to start the journal turning.

It is an object of the present invention to move this starting or break-away friction to a very low value by the introduction of oil at high pressure to a small recess between the surfaces of the shoes and the journal. The high pressure oil effectively raises the journal off the bearing so that an oil film is formed over the surface of each bearing shoe, the oil film so formed requires of course to be of sufficient proportion to permit of very low speed rotation of the journal without break-down of the oil film. According to the invention as the speed of rotation of the journal is increased, a hydro dynamic oil film at a considerably lower pressure replaces the high pressure oil film and takes over the work of supporting the journal. The high pressure oil is delivered to the bearing shoes in fixed quantities from a motor operated pump. Since, in manufacture and assembly of the bearings it is possible for a slight difference in clearance to arise, there is a likelihood that the high pressure oil will escape at one or two bearing shoes with no lifting action taking place at the others.

It is a further object of the present invention to provide a flow restriction in the high pressure line to each bearing shoe the flow restriction being so proportioned that an equal part of the high pressure pump discharge will be fed to each bearing shoe.

The following is a description by way of example of one embodiment of the present invention, reference being made to the accompanying drawings in which:

FIGURE 6 is a part sectional elevation of a flow restrictor; and

FIGURE 7 is a sectional elevation of an alternative type of a flow restrictor.

Figure 1:
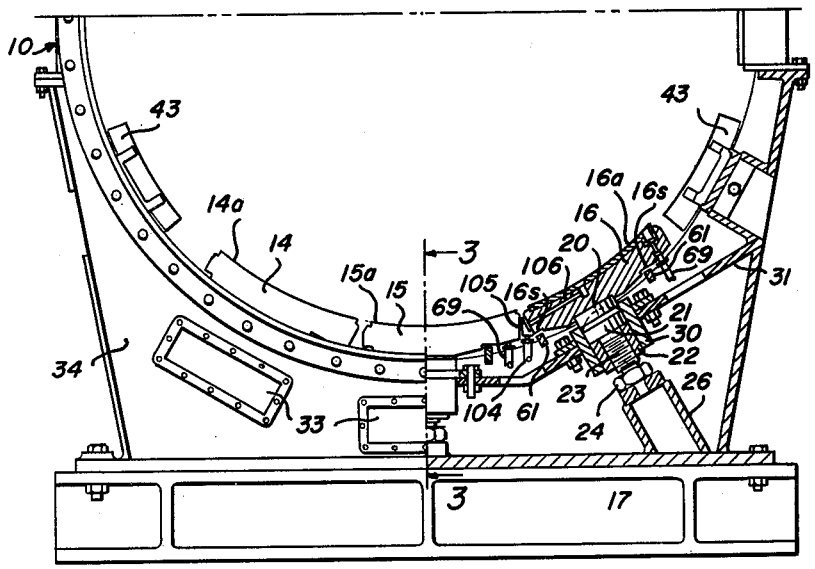
FIGURE 1 is a front elevational view of a trunnion bearing partially in section and with the sealing flange removed.
Figure 3:
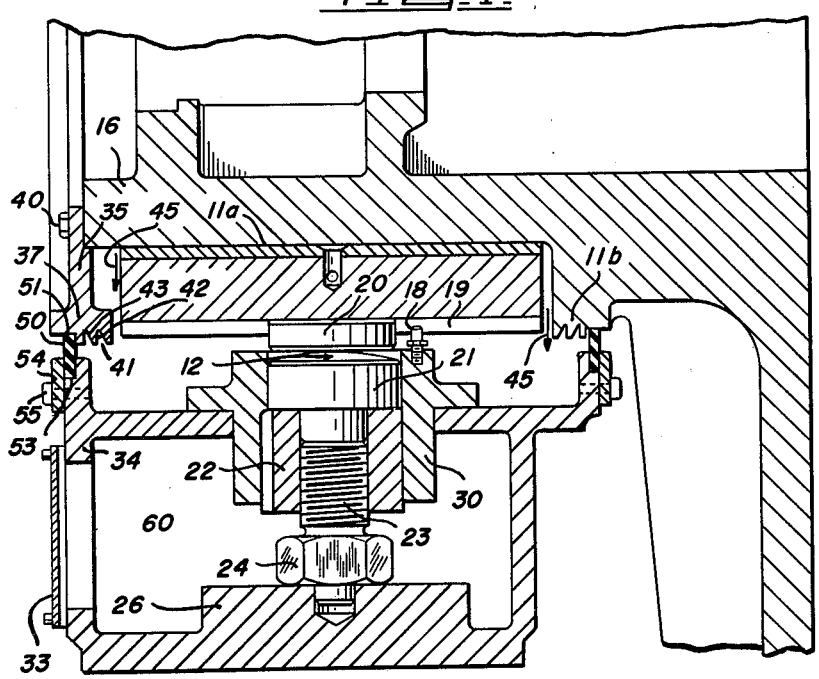
FIGURE 3 is a sectional side view on the line 111—111 of FIGURE 1, with the journal in place.
Figure 8:
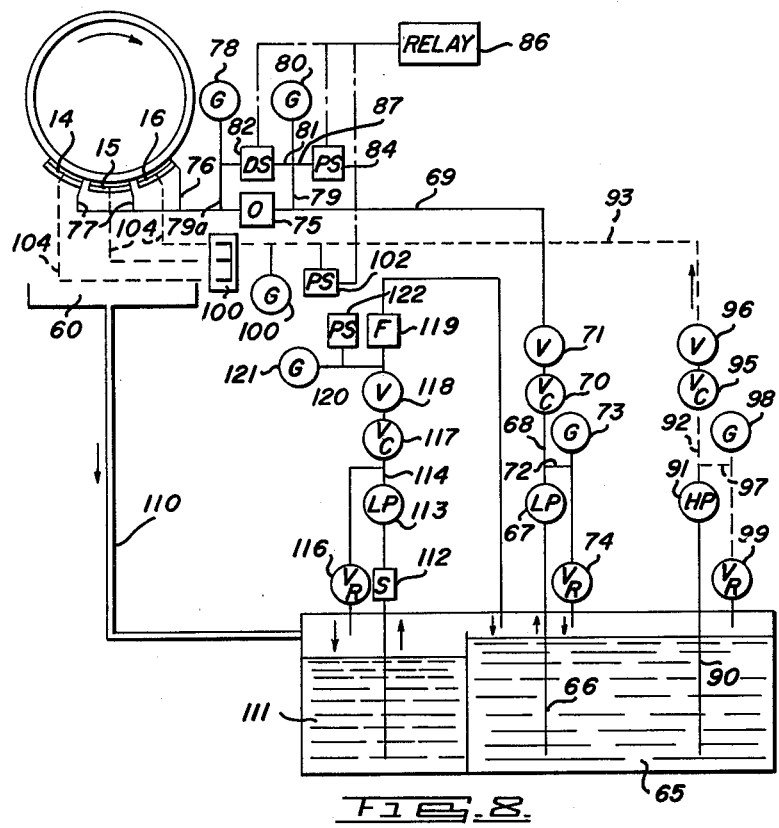
FIGURE 8 is a diagrammatic representation of the hydraulic system for the trunnion.

Referring now to the drawings:

FIGURE 1 shows a trunnion bearing 10 adapted to receive a substantially cylindrical journal 11 (FIGURE 3) which journal has a bearing surface 11a and a sealing shoulder 11b, for rotation on three radially spaced bearing shoes 14, 15 and 16. The bearing shoes are mounted on individual supporting members 12 which maintain the shoes in engagement with the journal 11. Each supporting member includes a universal mounting pivot 21 which is substantially hemispherical in shape and cooperates with a flat pivot pad 20 on each of the shoes 14, 15 and 16. Preferably the curvature of the dome of the substantially hemispherical pivot 21 is of such an order as to give the dome one-half inch height with nine inch diameter. Both the pivot 21 and the pivot pad 20 are made from alloy steels of great hardness and low deformation characteristics. Beneath the pivot 21 is an internally threaded collar 22 which mates with an externally threaded jack member 23 operated by an integral nut 24 and provided with a stem 25 which is mounted for rotation in a collar 26 welded to a frame member 17 (FIGURE 1) or welded to the trunnion housing 10 (FIGURES 1 and 3). A rotation of the nut 24 causes the jack member 23 to mesh with the collar 22 and move it in guides 30 to apply a thrust to the underside of the pivot 21 whereby to cause said pivot to engage with the pivot pad 20 and urge the bearing shoe radially inward into engagement with the journal 11. Operational access is obtained through the cover plates 33 on the bearing housing front wall 34.

When the bearing shoes are mounted so as to tilt freely as described above, they are constrained so that;
(1) the axis of curvature of the shoes remains parallel to the axis of the journal,
(2) the shoe is prevented from moving circumferentially in the direction of rotation as the journal rotates.

In the embodiment of the invention as described with reference to FIGURES 1 and 3, the guide 30 is secured by a bracing plate 31 to the housing against movement. The locating pin 18 is fixed in the guide 30 and engages in a transverse groove 19 in the bearing shoe, thus preventing its rotation around its radial centre line. The pivot pad 20 is a close sliding fit in recesses in both the bearing shoe and the guide 30 thereby preventing circumferential movement of the shoe.

In FIGURE 3, an annular flange is generally indicated at 35. The annular flange has a peripheral web portion 37 and is attached to the journal 11 at the end remote from the sealing shoulder 11b by a plurality of set bolts 40 equally spaced around the journal. The web 37 is provided near its inside edge with a pair of circumferentially V-shaped grooves 41 having a vertical wall 42 and an inclined wall 43. Oil leakage from the bearing shoe 16 is as shown by the arrows 45. Egress of the oil between the flange 35 and the front wall 34 of the bearing housing is minimized by the grooves 41. The theory behind the oil escape prevention is that a droplet of oil entering the grooves 41 in an attempted passage along the flange 37 to the outside of the bearing housing 34 lands on the inclined surface 43 of the grooves 41 and centrifugal force, due to the rotation of the journal, acts on the droplet to tend to drive it towards the larger diameter of the inclined surface, i.e. away from the seal member 50. The seal member 50 is preferably of felt or like material, and contacts the flange 35 by abutting against a recess 51 in the web 37 of the flange 35. The seal member may be attached by any suitable means, for example, the wall of the bearing housing 34 may be recessed at 53 and provided with a retaining plate 54 held in place by a plurality of set screws 55.

The sealing shoulder 11b of the journal 11 is provided with a similar groove means for minimizing the egress of oil and sealing means for prohibiting ingress of foreign matter. Spent oil from the bearing surfaces 14a, 15a, 16a of the bearing shoes 14, 15 and 16 is collected in the sump 60 in the journal housing 34.

When it is desired to service an individual bearing shoe a nut 24 is turned to retract the collar 22 and permit the pivot 21 to be forced down under the weight of the bearing shoe. The bearing shoe is provided with a pair of shoulders 16s (see FIGURES 1 and 4) which, on retraction of the bearing shoe from the journal, engage on cradle bars 61 thereby upholding the bearing shoe and permitting the pivot 21 to be withdrawn from the pivot pad 20 by the further operation of the nut 24.

On removing the annular flange 35 from the journal 11 a bearing shoe can (for resurfacing or like maintenance operation) be slid out of the bearing housing on the cradle bars 61 so that the shoe may be completely removed, the journal being supported at this time by the two remaining shoes.

Figure 2:
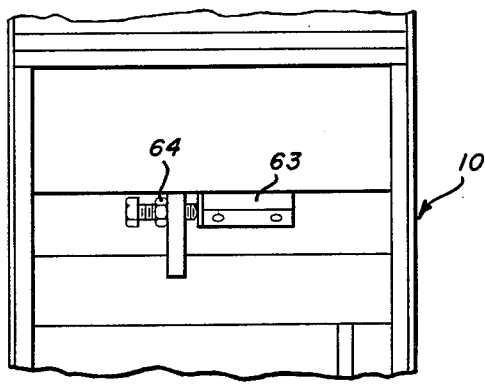
FIGURE 2 is a part end view illustrating a thrust block device suitable for use with the bearing shoes shown in FIGURE 1.

A pair of thrust blocks 63 (see FIGURE 2) are mounted in engagement with the sealing shoulder 11b of the journal by an adjustable thrust screw and collar assembly 64 on the side of the bearing housing.

Referring now to FIGURES 1, 6 and 7, 8. Oil is drawn from the reservoir 65 through a conduit 66 by a low pressure pump 67 and fed through conduit 68, through a low pressure line 69. The conduit 68 is provided with a check valve 70 and a shut-off valve 71. A branch line 72 of the conduit is connected to a gauge 73 and a relief valve 74. If the pressure in the conduit 68 from the low pressure pump 67 exceeds a preselected value, the relief valve 74 opens and the oil is returned to the reservoir 65. The low pressure line 69 has an orifice unit 75 therein and from the other side of the orifice is connection to the leading edges of shoes 14, 15 and 16. From the low pressure line 69 branch lines 76, 77 are provided to this end. Branch lines 79, 79a extend from either side of the orifice 75. The pressure in branch line 79a is measured at gauge 78 and pressure at branch line 79 is measured at gauge 80. Hydraulic connection 81 between the branch line 79 and 79a is provided in which there is a differential pressure switch 82 and a pressure switch 84 is hydraulically connected to the line 87. Both the differential pressure switch 82 and the pressure switch 84 are electrically connected with a relay 86 in the mill motor starter to prohibit the starting of the mill in case of the insufficiency of oil flow or pressure to the shoes 14, 15, 16.

Oil is also drawn from the reservoir 65 through conduit 90 by the high pressure pump 91 and is transmitted from the pump 91 via conduit 92 to the high pressure line 93. In the conduit 92 there is provided a check valve 95 and a shut-off valve 96. A branch line 97 from the conduit 92 is hydraulically connected to a gauge 98 and a relief valve 99, which relief valve operates if the pressure in the conduit 92 exceeds a predetermined value. The high pressure line 93 is connected with a manifold flow restrictor 100. The line 93 is also hydraulically connected to a gauge 101 and a pressure switch 102, which pressure switch is electrically connected with the relay 86. From the flow restrictor 100 high pressure conduits 104 supply high pressure oil to the shoes 14, 15 and 16. The high pressure supply 104 is connected through an angle connector 105 (which permits of the universal rocking of the shoes) with an internal conduit 106 in the bearing shoes.

Spent oil from the bearing surfaces 14a, 15a, 16a of the bearing shoes is collected in the pump 60 of the bearing housing and returned by a gravity return line 110 to a dirty oil compartment 111. The dirty oil is drawn from the compartment 111 through a strainer 112 by a low pressure pump 113. Pump 113 pumps the oil through conduit 114 back to the reservoir 65. The conduit 114 is hydraulically connected to a relief valve 116 which operates to return the oil to the compartment 111 if the pressure in the conduit 114 exceeds a pre-determined value. Also in the line 114 is a check valve 117, a shut-off valve 118 and a filter 119. Between the check valve and the filter 119 is a branch line 120 hydraulically connected to a gauge 121 and a pressure switch 122. The pressure switch is provided to give warning when the filter needs servicing.

FIGURES 6 and 7 show alternative constructions of flow restrictors. In FIGURE 6 a manifold has been generally indicated, but in FIGURE 7 a single flow restrictor is shown although it will be appreciated that a plurality of flow restrictors as shown in FIGURE 6 may be provided.

In FIGURE 6 the manifold and restrictor valve 100 comprises a manifold housing which has an inlet conduit 124 to which a plurality of branch orifices 123 are connected. In each of the branch orifices 123 there is provided a restrictor body 125. The restrictor body 125 has an axial bore 126 and fits snugly within the orifice 123, sealing rings 127 being provided to prevent the passage of oil over the outside surface of the restrictor body 125. The restrictor body has an inlet conduit 128 and an outlet conduit 129 opening into the axial bore 126. Within the axial bore there is provided a metering pin 130. The metering pin is cylindrical in shape and fits closely into the restrictor body at locating portions 132, 133. The locating portion 133 is provided with a sealing ring 134 at one end. The centre portion 135 of the metering pin 130 is dimensioned to define with the axial bore 126 an annular restricted passage 136. Short portions 140, 141 of smaller diameter are provided on either side of the central portion 135 and are so arranged as to cooperate with the inlet and outlet conduits 128, 129 in the restrictor body 125.

Oil under pressure enters the conduit 124 and is distributed to the branches 123 where it enters in each instance an inlet conduit 128 of the associated restrictor body. The oil is transmitted along the annular restricted passageway 136 and out through conduit 129 in the restrictor body 125. The oil from the restrictor body is then transmitted to the high pressure conduits 104 of the bearing shoes 14, 15 and 16.

The flow passing through the annular passage 136 is a function of the pressure drop across the passage, a typical operational value of which is 2000 p.s.i. The metering pin 130 is readily removable for cleaning purposes and it will be noted that owing to the shape of the restrictor passage 136 a considerable number of particles of foreign matter would have to enter the passage before any appreciable blockage could take place.

In FIGURE 7 there is shown an alternative type of flow restrictor. The manifold 150 has an inlet conduit 151, a cross-passage 151a and an outlet conduit 152. Screw threadedly connected to the manifold 150 is a restrictor body 154 which has an axial passageway 156 therein to receive a metering pin 157. The metering pin 157 is cylindrical in shape and fits very closely against the wall of the cylindrical bore 156. The metering pin 157 is provided with a square section helical groove open at its inner end to the passage 151a and to its outer end to the outlet conduit 152. The square section helical groove forms with the walls of the axial bore 156 a helical path restriction passage. Oil from the high pressure line 64 enters the conduit 151 and passes around the helical restrictor passage to the outlet conduit 152 which is hydraulically coupled to one of the conduits 104 for the high pressure supply to the bearing shoes. The rate of flow through the helical restriction passage is related to the width, depth and mean length of the groove and to the pressure drop across the restrictor. The advantages of this restrictor are similar to the restrictor of FIGURE 6 with the added advantage that owing to the greater sizes involved errors in machining are of less consequence.

Figure 4:
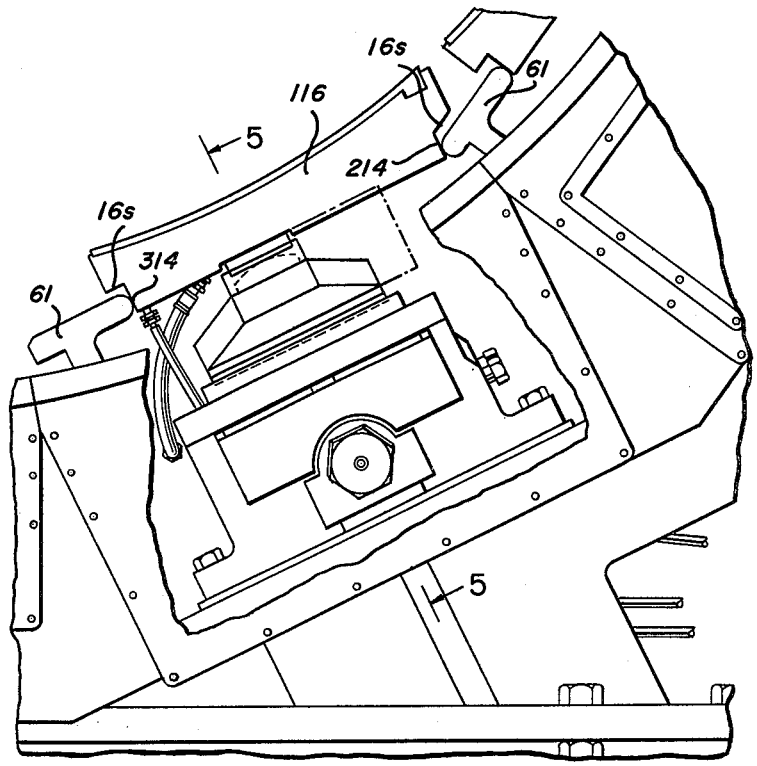
FIGURE 4 is a detail in front elevation of an alternative form of mounting.
Figure 5:
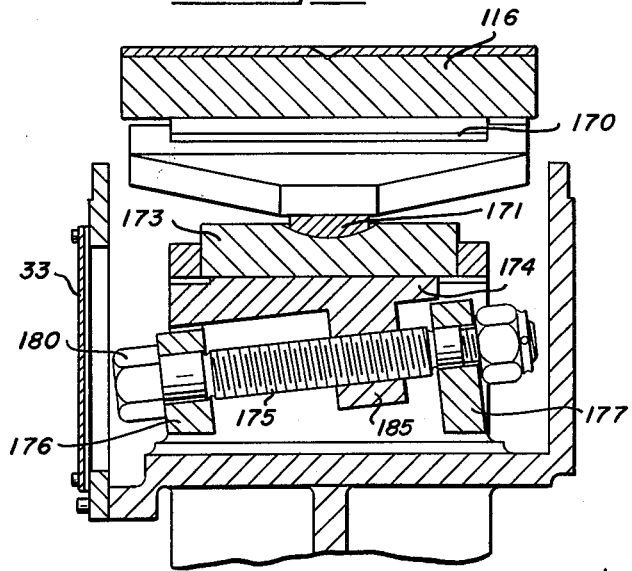
FIGURE 5 is a section on the line 5—5 of FIGURE 4 looking in the direction of the arrows.

In FIGURES 4 and 5 there is shown an alternative construction of bearing shoe support. The hydraulic supply conduits have been omitted from FIGURE 4 and one bearing shoe only is illustrated. The bearing shoe 16 is provided with an upper pivot 170 of cylindrical form permitting the shoe 16 to tilt in the direction of rotation of the journal which it is supporting. A lower pivot 171 of cylindrical form 5 is provided to permit the shoe assembly to tilt at right angles to the direction of rotation. The lower pivot 171 is mounted in the semi-cylindrical recess in block 173. The block is supported on a wedge 174 which is adjustable by means of an adjusting screw 175 located in collars 176, 177. By removing the plate 33 access is afforded to the nut 180 of the adjusting screw 175 and rotation of this adjusting screw causes it to mesh with the internally threaded section 185 of the wedge 174 whereby to raise and lower the block 173, the pivots 171, 170 and the bearing shoe 116. In normal operation the wedge 174 is arranged to maintain the bearing shoe 116 in engagement with the journal which it is supporting, however when an individual shoe requires servicing the wedge is moved to lower the pivots out of engagement with the shoe 116 whereby to cause its shoulders 16s to rest upon the cradle bars 61. As before, removal of the annular flange member 35 permits the bearing shoe to be slid out of the trunnion housing on the cradle bars 61 for servicing.

In FIGURE 4 it will be noted that the cradle bars 61, when not in use to uphold the bearing shoe, fit closely against the underside leading and trailing edges 214, 314 of the bearing shoe 16, thus preventing motion of the shoe both around its radial centre line and circumferentially. It will be noted that these constraints do not interfere with the removal of the shoe for servicing.

What I claim as my invention is:

1. In a trunnion bearing for use with a substantially cylindrical journal, a trunnion housing including a spent oil sump; a plurality of bearing shoes within said housing radially spaced above said sump to support said journal; high pressure oil supply means for applying a film of oil to the bearing surfaces of said shoes whereby to create an oil film between said shoes and said journal when at rest; a low pressure oil supply means for applying oil at a relatively low pressure to the bearing surfaces of said shoes to create a hydrodynamic oil film between said journal and said bearing shoes when the journal is in motion in the bearing; means to select the high or low pressure oil supply; individually adjustable supporting means for supporting each bearing shoe in engagement with said journal, said supporting means including a universal mounting for said bearing shoe; and means for retracting an individual supporting means to permit the associated shoe to disengage from said journal.

2. A trunnion bearing as claimed in claim 1, in which three bearing shoes are provided and in which the high pressure oil is applied substantially at the centre of each bearing shoe and the low pressure oil is applied at the leading edge of each shoe.

3. A trunnion bearing as claimed in claim 1, wherein said universal mounting comprises: a semi-spherical mounting member on said support member and a co-operating semi-spherical member for said bearing shoe.

4. A trunnion bearing as claimed in claim 1, in which said adjusting means comprises a screw-threaded jack member.

5. In a trunnion bearing for use with a substantially cylindrical journal; a trunnion housing including a spent oil sump; a plurality of bearing shoes within said housing above said sump and radially spaced to support said journal; high pressure oil supply means for applying oil to the bearing surfaces of said shoes whereby to create an oil film between said shoes and said journal when at rest; a low pressure oil supply means for applying oil at a relatively low pressure to the bearing surfaces of said shoes whereby to create a hydrodynamic oil film between said journal and said bearing shoes when the journal is in motion in the bearing; means to select the high or low pressure oil supply; individual adjustable supporting means for supporting each bearing shoe in engagement with said journal, said supporting means including a universal mounting for said bearing shoe; means for retracting an individual supporting means to permit the associated shoe to disengage from said journal; annular flange means releasably secured to the outermost end of said journal to readily overlie the outside of said bearing shoes in close proximity to said trunnion housing; and flexible sealing means between said flange means and said trunnion housing whereby said flange means and said sealing prevent the egress of spent oil and the ingress of foreign bodies to said bearing shoes whilst permitting the passage of spent oil from said bearing shoes to said sump.

6. A trunnion bearing as claimed in claim 5, in which said sealing flange comprises: a ring member adapted to be removably attached to said journal and having a peripheral web portion provided with at least one peripheral groove.

7. A trunnion bearing as claimed in claim 5, wherein said removable flange comprises: an annular ring member adapted to be removably attached to said journal and having a peripheral web portion provided with a pair of circumferential substantially "V-shaped" grooves on the web face and a recess in said web portion adjacent the outside thereof adapted to cooperate with said flexible sealing means.

8. A trunnion bearing for use with a journal having a sealing shoulder at one end and a cylindrical bearing surface comprising: a trunnion housing including a spent oil sump; thrust bearing means on said trunnion housing for cooperation with said sealing flange on said journal; a plurality of bearing shoes within said housing radially spaced above said sump to support said journal; high pressure oil supply means for applying oil to the bearing surfaces of said shoes whereby to create an oil film between said shoes and said journal when at rest; a low pressure oil supply means for applying oil at a relatively low pressure to the bearing surfaces of said shoes to create a hydrodynamic oil film between said journal and said bearing shoes when the journal is in motion in the bearing; means to select the high or low pressure oil supply; individual adjustable supporting means for supporting each bearing shoe in engagement with said journal, said supporting means including a universal mounting for said bearing shoe; means for retracting an individual supporting means to permit the associated shoe to disengage from said journal, annular flange means releasably secured to said journal at its end remote from the sealing shoulder, said flange being adapted to radially overlie the said bearing shoes in close proximity to the trunnion housing; flexible sealing means between said flange means and said trunnion housing and said sealing shoulder and said trunnion housing; and groove means in said flange and said sealing shoulder to prohibit the egress of spent oil from said bearing shoes to said flexible sealing means whilst permitting the passage of spent oil from the bearing shoes to said sump, said flexible sealing means prohibiting the ingress of foreign matter to said bearing shoes.

9. A supporting member for a trunnion bearing shoe adapted to support a journal comprising: a curved pivot pad on the underside of a bearing shoe to be supported, a compatibly curved pivot member adapted to cooperate with the first-mentioned pivot pad to form a universal mounting for said shoe; screw jack means adapted to cooperate with the underside of said pivot member to maintain the bearing shoe in engagement with said journal;

and cradle means beneath said bearing shoe adapted to uphold the bearing shoe when said screw jack is operated to move the pivot means out of engagement with the pivot pad.

10. Apparatus as claimed in claim 8, in which said pivot pad is convex and pivot means is concave.

11. A supporting member for a trunnion bearing shoe comprising: a pivot member beneath a shoe to be supported, and adapted to permit said bearing shoe to rock in the direction of rotation of the journal which it supports, second pivot means beneath said first pivot means adapted to permit said bearing shoe to pivot at right angles to the direction of rotation of said journal and screw jack operated wedge means beneath said second mentioned pivot means adapted to maintain the bearing shoe in engagement with said journal, and cradle means beneath said bearing shoe adapted to uphold the bearing shoe when said wedge means is operated to move the pivot means out of engagement with the bearing shoe.

12. In a trunnion bearing for use with a substantially cylindrical journal, a trunnion housing including a spent oil sump; a plurality of bearing shoes within said housing radially spaced above said sump to support said journal; means for applying oil to the bearing surfaces of the shoes; individually adjustable supporting means for supporting each bearing shoe in engagement with said journal, said supporting means including a universal mounting for said bearing shoe; means for retracting an individual supporting means to permit the associated shoe to disengage from said journal; and cradle bar means adapted to support said shoe out of engagement with said journal when its supporting means has been retracted; said cradle bar means being adapted to permit of the longitudinal sliding of the said shoe therealong clear of said trunnion bearing.

13. In a trunnion bearing for use with a substantially cylindrical journal, a trunnion housing including a spent oil sump; a plurality of bearing shoes within said housing radially spaced above said sump to support said journal; means for applying oil to the bearing surfaces of the shoes; individually adjustable supporting means for supporting each bearing shoe in engagement with said journal, said supporting means including a universal mounting for said bearing shoe; means for retracting an individual supporting means to permit the associated shoe to disengage from said journal; cradle bar means adapted to support said shoe out of engagement with said journal when its supporting means has been retracted; said cradle bar means being adapted to permit of the longitudinal sliding of the said shoe therealong clear of said trunnion bearing; annular flange means releasably secured to the outermost end of said journal to radially overlie the outside of said bearing shoes in close proximity to said trunnion housing; and flexible sealing means between said flange means and said trunnion housing whereby said flange means and said sealing means prevent the egress of spent oil and the ingress of foreign bodies to said bearing shoes whilst permitting the passage of spent oil from said bearing shoes to said sump and the removal of the shoe from the trunnion.

References Cited in the file of this patent

UNITED STATES PATENTS

| 416,722 | Ditto | Dec. 10, 1889 |
| 1,734,026 | Bijur | Oct. 29, 1929 |
| 2,363,260 | Peskin | Nov. 21, 1944 |
| 2,447,605 | Treshow | Aug. 24, 1948 |